United States Patent Office 2,822,336
Patented Feb. 4, 1958

2,822,336
PREPARATION OF REFORMING CATALYSTS

Joseph A. Polack, Baton Rouge, La., assignor to Esso Research and Engineering Company, a corporation of Delaware No Drawing. Application November 30, 1953
Serial No. 395,324

3 Claims. (Cl. 252—465)

The present invention relates to improvements in the manufacture of catalysts and particularly catalysts which are useful in the reforming of petroleum naphthas.

It is known that petroleum naphthas can be subjected to a reforming treatment to yield liquid products boiling within the gasoline boiling range and possessing improved octane numbers. A well known and widely used process for upgrading petroleum naphthas is called hydroforming. In hydroforming, the naphtha feed stock is treated at elevated pressures and temperatures of 750–1050° F. in the presence of a solid catalyst and in the presence of hydrogen or of recycle gas rich in hydrogen. A variety of reactions including dehydrogenation, paraffin and naphthene isomerization, cyclization or aromatization, hydrogenation and hydrocracking occur during hydroforming. All of these reactions contribute to the production of a product of increased value not only because of its higher octane number but also because of its improved cleanliness characteristics due to the elimination of gum forming unsaturated constitutents and the removal of sulfur from sulfur-containing constituents.

Catalysts that have been used in hydroforming include various metals such as platinum and palladium and oxides or sulfides of group VI metals, particularly molybdenum, chromium, vanadium and tungsten. These catalysts are usually supported on a base or spacing agent preferably upon a high surface area alumina-containing composition such as various activated aluminas and also upon zinc-aluminate spinel. The latter compositions representing a chemical combination of aluminum oxide with zinc oxide have been prepared by reacting aqueous solutions of metal salts with basic solutions such as ammonium hydroxide or by reacting sodium aluminate with a zinc salt such as zinc sulfate, nitrate or chloride. Other alternatives that have been suggested include the conversion of zinc and aluminum chloride into zinc and aluminum oxide gels by reaction wtih ethylene oxide; the conversion of zinc and aluminum metal by hydrosols by the action of dilute formic or acetic acid in the presence of a mercury salt and mixing the resultant hydrosols; dissolving zinc oxide in an aluminum salt solution and mixing zinc and aluminum oxides or hydroxides in the presence of a nitrogenous base such as ammonia to form a complex ammonium compound which can be decomposed to form the zinc aluminate. In general, these methods suffer from the disadvantage of requiring the use of expensive reagents or difficult and costly procedures of preparation. For example, the precipitate obtained by reacting a sodium aluminate solution with a zinc sulfate solution is so gelatinous that it is practically impossible to lower the residual sulfate content to a sufficiently low level to meet specifications by a reasonable amount of washing. Accordingly, these zinc aluminate spinel supports are relatively high in cost and because of this cost they are at a distinct disadvantage in competition with activated alumina for use as a support for hydroforming catalysts.

It is the object of this invention to provide the art with novel compositions useful as supports for hydroforming catalysts.

It is also the object to provide the art with novel compositions useful as supports for hydroforming catalysts that may be prepared in a simple, facile manner.

These and other objects will appear more clearly from the detailed specification and claims which follow:

It has now been found that catalyst supports substantially equal in properties to the zinc aluminate supports described above can be prepared by simply mixing finely divided alumina and zinc oxide and heating the resulting mixture to temperatures of from 1100 to about 1400° F. While the resultant product comprises a mixture of zinc oxide, alumina and some zinc aluminate, it may be used effectively as a support for molybdic oxide or other catalytic compound to form active catalysts for hydroforming or aromatization of petroleum naphtha fractions. Since zinc oxide and alumina are inexpensive starting materials certainly as contrasted to the other materials heretofore used for the preparation of zinc aluminate spinel and do not require the use of additional materials or reagents to bring about a chemical combination of the starting materials and do not contain any objectionable ions which would be difficult or expensive to remove, it may be readily seen that the present invention provides a very economical method for preparing hydroforming or aromatization catalyst supports. The molybdic oxide or other catalytic agent may be added to the support or spacing agent by impregnation as with solutions of ammonium molybdate or the like or by dry mixing the support with molybdic oxide or a compound that may be decomposed to molybdic oxide by merely heating. If desired, the active ingredient such as $MoO_3$ may be incorporated into the original dry mix of zinc oxide and alumina in order to make the complete catalyst in a single operation. In accordance with an alternative procedure zinc metal may be mixed, heated with the alumina under conditions to volatilize and/or distribute the zinc upon the alumina whereupon the zinc is oxidized to zinc oxide.

The zinc oxide and alumina may be derived from any convenient source. For example, the alumina may be prepared by the dehydration of alumina trihydrate, by the hydrolysis of an aluminum alcoholate such as aluminum amylate or the like, or it may be a commercially available alumina such as Alorco F–10, Alorco H–41 or Porocel or it may be an alumina prepared by precipitation from the acid extract obtained in the acid activation of montmorillonite or meta halloysite type clays. The alumina should be adsorptive, i. e. it should have a surface area of at least 70 sq. meters per gram and preferably at least 125–250 sq. meters per gram although it may be even higher in surface area. The zinc oxide and alumina should be as fine as practicable, for example, fine enough to pass through a 100 mesh sieve.

The zinc oxide and alumina are preferably used in equimolar proportions but may be used in ratios of from about 1 mol of zinc oxide to 2 mols of alumina to about 2 mols of zinc oxide per mol of alumina. The dry ingredients are intimately mixed or blended together either by passage through a ball mill, conical blender or other mechanical mixing device or by passing an aeration gas through the mixture to form a dense, turbulent, fluidized mass.

The mixture of dry ingredients is then subjected to calcination for from 3 to about 16 hours and at temperatures from about 1100 to 1400° F. The maximum temperature is ordinarily governed by the heat stability of the alumina, the more stable aluminas permitting the use of temperatures above 1400° F. Ordinarily calcination for about 6 hours is preferred.

The calcined mixture is then either cooled and impregnated with a solution of the catalytic component or the catalytic component is directly introduced into the calcined mixture. For example, the calcined mixture can be impregnated with a soluble compound of a group VI metal and the latter may be precipitated by the addition of ammonium hydroxide or other suitable precipitants. Alternatively, the calcined mixture can be impregnated with a solution of ammonium molybdate or other compound which may be decomposed to the oxide by simply heating the same. Alternatively, the calcined mixture may be intimately mixed in the dry state with the catalyst component such as molybdic oxide, chromic oxide, vanadic oxide or the like. Ordinarily, when using these compounds it is preferred to incorporate these compounds into the mixture of zinc oxide and alumina before calcination. The amount of catalytic component added should be sufficient to provide from about 5 to 20 wt. % $MoO_3$ or from 8 to 40 wt. % $Cr_2O_3$ in the final composition. The catalyst is activated by heating to temperatures of about 1100–1400° F. for from 3 to 8 hours, preferably for 6 hours at 1200° F. before use in a hydroforming operation. If the catalyst component is incorporated with the zinc oxide and alumina before subjecting the same to calcination, a single calcination will be sufficient.

The following examples are illustrative of the present invention:

*Example 1*

265 grams of C. P. zinc oxide and 444 grams of alumina prepared from an aluminum alcoholate were dry mixed in a ball mill. The alumina contained 24.7% volatile matter so that the equimolar amounts of the two oxides were used. Two batches of the mixed material were prepared and then composited. The resultant mixture was heated for six hours at 1400° F. X-ray examination of the resultant product was made and a definite pattern of zinc aluminate spinel was observed. The spinel pattern was stronger than was to be expected from the heating conditions used during the base preparation. There were also equally strong lines of zinc oxide present, indicating incomplete conversion to spinel. There were no identifiable alumina lines, but these were probably masked. Thus the base consists of zinc aluminate spinel and a mechanical mixture of zinc oxide and alumina.

560 grams of the calcined mixture or base was dry-mixed in a ball mill with 62.25 grams of C. P. $MoO_3$. This batch of catalyst was composited with another batch of catalyst prepared from the same materials and under identical conditions. The catalyst was activated by heating at 1200° F. for 6 hours.

This catalyst was used to hydroform a 200–330° F. boiling range virgin naphtha. The operating conditions were 900° F. and 50 p. s. i. g. with a feed rate of 0.99 v./v./hr. Hydrogen was circulated through the reactor at a rate of 1500 cu. ft. per barrel of feed. The results obtained were as follows:

| | |
|---|---|
| Aniline point of $C_6+$[1] | 50° F. |
| $C_6+$ bottoms | 83.0 vol. percent. |
| Carbon | 0.53 wt. percent. |
| Gas | 10.2 wt. percent. |

[1] Note: The aniline point is a measure of octane number and indicates the severity of the upgrading operation.

A catalyst of the same molybdic oxide content supported on a zinc aluminate base prepared by reaction of sodium aluminate with a zinc salt as disclosed in Kearby U. S. Patent No. 2,447,017 was used to hydroform the same feed stock under the same conditions pointed out above. The results obtained with this reference catalyst were as follows:

| | |
|---|---|
| Aniline point of $C_6+$ | 50° F. |
| $C_6+$ bottoms | 85 vol. percent. |
| Carbon | 0.85 wt. percent. |
| Gas | 8.0 wt. percent. |

It may be seen from this data that catalysts prepared in accordance with the present invention have substantially the same activity as the reference catalyst but produce much less carbon. This is a definite advantage, particularly in a fluidized solids operation because of the high costs of compressing air to burn off the carbonaceous deposits at system pressure.

*Example 2*

265 grams of C. P. zinc oxide, 332 grams (dry basis) of commercial alumina (such as Nalco HF–85 or Alcoa H–41), and 66 grams of C. P. $MoO_3$, all in a finely divided state, are intimately commingled in a ball mill or conical blender. The alumina is of proper particle size for fluidization. The resulting mechanical mixture is then heated for 8 hours at 1400° F. to prepare a finished catalyst of substantially the same properties as the catalyst of Example 1.

*Example 3*

213 grams of finely divided pure zinc metal are mixed, dry, with 332 grams (dry basis) of powdered, high surface area alcoholate alumina. The resultant mechanical mixture is then heated in a stream of air for 3 hours at 1500° F. The mixture is then impregnated with ammonium molybdate by well known means to deposit about 65 grams of $MoO_3$ on the base mixture. After drying, the catalyst is activated by heating 6 hours at 1200° F.

*Example 4*

A dry mixture is made of 133 grams of zinc oxide, 332 grams high surface area alumina, and 52 grams of molybdenum trioxide, all in powdered form. The powdered mixture is then formed into pellets (say ¼" or ⅜" size) by conventional tabletting equipment. Pilling aid such as Sterotex may be used. The resultant pills are then heated in a muffle furnace for 6 hours at 1400° F. Alternatively, they are heated in the hydroforming reactor by hot air prior to starting hydroforming operations.

Catalysts prepared in accordance with the present invention may be used to advantage in the hydroforming of petroleum fractions boiling within the motor fuel or naphtha range such as virgin naphtha, cracked naphtha, Fischer-Tropsch naphtha or the like. The feed stock may have a boiling range of from about 125–450° F. or it may be a narrow boiling cut from within this range. The feed stock is ordinarily preheated to about 800–1000° F., preferably about 950° F. before charging to the reaction zone.

Recycle gas, which contains about 50 to 80 volume percent hydrogen, is preheated to about 1050–1200° F., preferably about 1150–1175° F. before introduction into the reaction zone. The recycle gas is circulated through the reaction zone at a rate of from about 1000 to 8000 cu. ft. per barrel of naphtha feed in order to supply heat for the hydroforming reaction and to minimize carbon deposition on the catalyst.

The hydroforming can be carried out in a fixed, moving bed or in a fluidized solids reactor system in which catalyst is continuously circulated between a reaction zone and a regeneration zone. The hydroforming reaction zone is operated at temperatures of from about 850° F. to about 1075° F. and at pressures of from atmospheric to about 250 lbs. per sq. inch, preferably at about 50 lbs. per sq. inch.

The regeneration of the spent reactor catalyst is effected by burning off carbonaceous deposits at temperatures of about 1050–1200° F. In fluidized solids systems, the regeneration is effected at substantially the same pressure as is maintained in the hydroforming reaction zone in order to facilitate transfer of the catalyst solids between these two zones. In some cases, particularly in fixed bed operation, regeneration at or near atmospheric pressure may offer some advantages in control of temperatures, removal of adsorbed materials, particularly water and sulfur compounds and control of the reduction or partial reduction of the regenerated catalyst. In fluidized solids systems, the average residence time of the catalyst in the reaction zone is of the order of from about 3 to 4 hours while the average residence time of the catalyst in the regenerator is of the order of from about 3 to 15 minutes, although when running certain feed stocks, particularly high sulfur feeds, it may be desirable to increase the holding time of the catalyst in the regenerator to about one hour.

The weight ratio of catalyst to oil introduced into to the reactor is from about 0.5 to about 3.5. Space velocity or the weight in pounds of feed stock charged per hour per pound of catalyst in the reaction zone depends upon the age or activity level of the catalyst, the character of the feed stock and the desired octane number of the product. It may vary from about 1.5 w./hr./w. to about 0.15 w./hr./w.

The foregoing description contains a limited number of embodiments of the present invention. It will be understood, however, that numerous variations are possible without departing from the scope of the present invention.

What is claimed is:

1. The method of preparing hydroforming catalysts which comprises intimately mixing zinc oxide, alumina and molybdenum oxide in the dry, finely divided state in a molar ratio of zinc oxide to alumina of between 1 to 2 and 2 to 1 and calcining the resultant mixture at 1100–1400° F. for from 3 to 16 hours.

2. The method of preparing hydroforming catalysts which comprises intimately mixing zinc oxide, alumina and chromium oxide in the dry, finely divided state in a molar ratio of zinc oxide to alumina of between 1 to 2 and 2 to 1 and calcining the resultant mixture at 1100–1400° F. for from 3 to 16 hours.

3. The method of preparing hydroforming catalysts which comprises intimately mixing zinc oxide, alumina and a metal oxide selected from the group consisting of molybdenum oxide and chromium oxide in the dry, finely divided state in a molar ratio of zinc oxide to alumina of between 1 to 2 and 2 to 1 and calcining the resultant mixture at 1100–1400° F. for from 3 to 16 hours.

References Cited in the file of this patent

UNITED STATES PATENTS

| | | |
|---|---|---|
| 2,269,508 | Barton | Jan. 13, 1942 |
| 2,401,246 | Hull | May 28, 1946 |
| 2,573,726 | Porter et al. | Nov. 6, 1951 |
| 2,623,020 | Gilbert | Dec. 23, 1952 |
| 2,677,649 | Kirshenbaum et al. | May 4, 1954 |